(12) United States Patent
Thomson et al.

(10) Patent No.: US 9,587,105 B2
(45) Date of Patent: Mar. 7, 2017

(54) FLUORINATED ACRYLATE BLOCK COPOLYMERS WITH LOW DYNAMIC SURFACE TENSION

(71) Applicant: BASF SE, Ludwigshafen (DE)

(72) Inventors: Mary Thomson, Mannheim (DE); Ralf Knischka, Neustadt (DE); Clemens Auschra, Freiburg (DE); Lothar Engelbrecht, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/375,670

(22) PCT Filed: Feb. 22, 2013

(86) PCT No.: PCT/EP2013/053567
§ 371 (c)(1),
(2) Date: Jul. 30, 2014

(87) PCT Pub. No.: WO2013/124421
PCT Pub. Date: Aug. 29, 2013

(65) Prior Publication Data
US 2015/0018476 A1    Jan. 15, 2015

Related U.S. Application Data

(60) Provisional application No. 61/602,096, filed on Feb. 23, 2012.

(30) Foreign Application Priority Data

Feb. 23, 2012  (EP) ..................... 12156662

(51) Int. Cl.
| | |
|---|---|
| C09D 7/06 | (2006.01) |
| C08L 53/00 | (2006.01) |
| C09D 153/00 | (2006.01) |
| C09J 153/00 | (2006.01) |
| C08G 18/62 | (2006.01) |
| C09D 11/106 | (2014.01) |
| C09D 11/107 | (2014.01) |
| C09D 11/108 | (2014.01) |

(52) U.S. Cl.
CPC .......... *C08L 53/00* (2013.01); *C08G 18/6225* (2013.01); *C08G 18/6275* (2013.01); *C09D 7/06* (2013.01); *C09D 11/106* (2013.01); *C09D 11/107* (2013.01); *C09D 11/108* (2013.01); *C09D 153/00* (2013.01); *C09J 153/00* (2013.01); *C08F 2438/02* (2013.01)

(58) Field of Classification Search
CPC ................... C09D 7/06; C08L 53/00
See application file for complete search history.

(56) References Cited

U.S. PATENT DOCUMENTS

| | | | |
|---|---|---|---|
| 2003/0100675 A1 | 5/2003 | Goetz et al. | |
| 2003/0114593 A1* | 6/2003 | Goetz et al. ................ | 525/227 |
| 2004/0223924 A1* | 11/2004 | L'Alloret ..................... | 424/59 |
| 2004/0236007 A1 | 11/2004 | Pirrung et al. | |
| 2004/0254268 A1 | 12/2004 | Cernohous et al. | |
| 2008/0312377 A1 | 12/2008 | Schmidt et al. | |
| 2011/0224356 A1 | 9/2011 | Schmidt et al. | |

FOREIGN PATENT DOCUMENTS

| | | |
|---|---|---|
| GB | 2 335 190 | 9/1999 |
| GB | 2 361 235 | 10/2001 |
| JP | H03-203-20346 | 1/1991 |
| JP | H04-65409 | 3/1992 |
| JP | 2001-206923 | 7/2001 |
| WO | WO 96/30421 A1 | 10/1996 |
| WO | WO 98/01478 A1 | 1/1998 |
| WO | WO 98/58974 A1 | 12/1998 |
| WO | WO 99/05099 A1 | 2/1999 |
| WO | WO 99/31144 A1 | 6/1999 |
| WO | WO 03/027159 A2 | 4/2003 |

(Continued)

OTHER PUBLICATIONS

Hawker et al. Chem. Rev. 2001, 101, 3661-3688 (herein Hawker).*
International Search Report issued May 7, 2013, in PCT/EP13/053567 filed Feb. 22, 2013.
Written Opinion of the International Searching Authority issued May 7, 2013, in PCT/EP13/053567 filed Feb. 22, 2013.
Office Action (notification of Reasons for Refusal) issued Dec. 5, 2016 in Japanese Patent Application No. 2014-558122.

(Continued)

*Primary Examiner* — Mark Kaucher
(74) *Attorney, Agent, or Firm* — Oblon, McClelland, Maier & Neustadt, L.L.P.

(57) ABSTRACT

The present invention relates to a composition, comprising a binder resin, a block copolymer which comprises at least a block A and a block B, wherein the block A comprises monomer units derived from a compound selected from (meth)acrylic acid, a (meth)acrylic acid ester, a (meth)acrylamide, a vinyl aromatic compound, or any mixture thereof, the block B comprises monomer units derived from a compound selected from a fluorinated (meth)acrylic ester having the following formula (I): $H_2C=C(R_1)(C(0)OR_{F-1})$, wherein R1 is H or methyl; and $R_{F-1}$ is an organic residue containing a perfluorinated $C_{4-6}$ alkyl group, a fluorinated alpha-olefin having the following formula (II): $H_2C=CH(R_{F-2})$ (II) wherein $R_{F-2}$ is an organic residue containing a perfluorinated $C_{4-6}$ alkyl group, i.e. $-(CF_2)_{3-5}-CF_3$ or any mixture thereof.

13 Claims, 1 Drawing Sheet

(56) References Cited

FOREIGN PATENT DOCUMENTS

| WO | WO 03/033603 A1 | 4/2003 |
| WO | WO 2005/059048 A1 | 6/2005 |
| WO | WO 2007/078819 A2 | 7/2007 |
| WO | WO 2009/103613 A1 | 8/2009 |

* cited by examiner

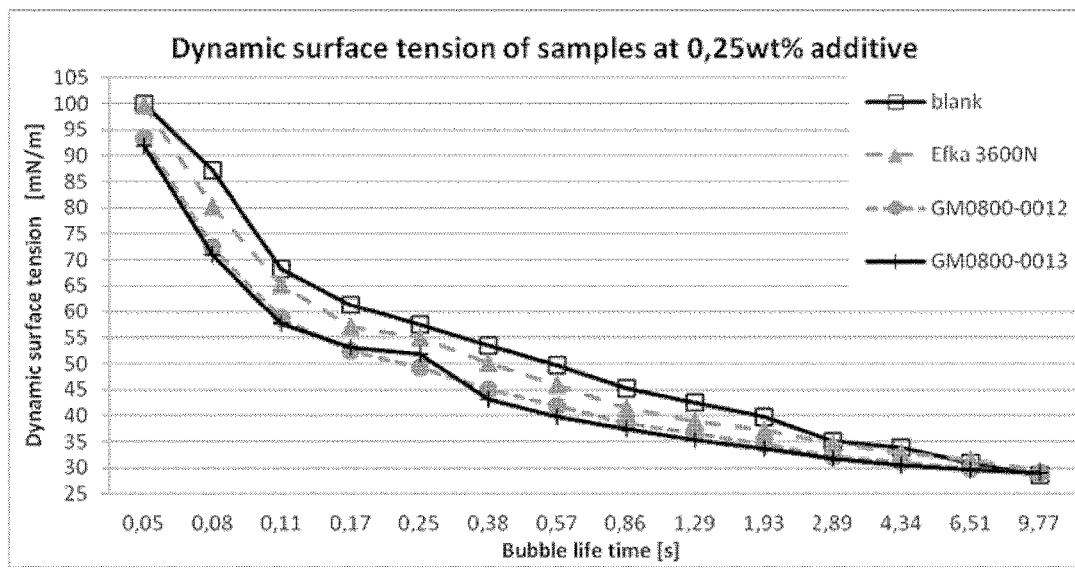

FLUORINATED ACRYLATE BLOCK COPOLYMERS WITH LOW DYNAMIC SURFACE TENSION

The present invention relates to a composition which comprises a block copolymer having fluorinated monomer units and to the use of said block copolymer as substrate wetting, anti-cratering and/or leveling agent for coating, ink and/or adhesive compositions.

Smooth and crater free surfaces are important for almost all coating, ink and adhesive applications; they provide not only a visually appealing film but serve also as a protective barrier for the substrate as well as homogenous bondstrength throughout the film.

When e.g. the coating is not homogenous and some parts of the surface are only thinly, or not all, coated it leads to poor protection of the substrate. As a result, substrate wetting, anti cratering and leveling agents are added to all sorts of coatings. These difficulties in application of coating resin, particularly in liquid systems, occur particularly when the surface tension of the liquid system is high and the surface tension of the substrate, or contaminants on the substrate, is much lower. The addition of substrate wetting and anti cratering additives reduces both the dynamic and static surface tension of the liquid coating, leading to smoother film formation.

As long as the viscosity of the coating formulation is low, sufficient substrate wetting and leveling can be achieved with commercially available additives. Large problems can be observed in the cases of high solids coatings, powdered coatings and high speed coating processes. There is a strong demand for substrate wetting and anti-cratering additives with a very low dynamic surface tension, which can provide smooth and uniform films in these highly demanding applications.

The same reasoning applies also for inks and adhesives.

Long chain perfluoro chemicals, typically with perfluorinated chains of length C8 and longer, are used as anti-cratering and leveling agents for coating compositions but are known to form very environmentally persistent degradation products, including perfluoro-octanoic acid (PFOA). Thus, there is a need for alternatives which do not form such environmentally persistent degradation products. However, any improvement in degradation properties should not be achieved at the expense of properties which are relevant for leveling agents such as low dynamic surface tension. In general, the effect on dynamic surface tension reduction is believed to decrease with the order of the perfluorinated unit.

WO 2005/059048 describes coating compositions containing leveling agents prepared by nitroxide mediated polymerization. Monomer units may be substituted by fluoro or perfluoro.

WO 2009/103613 describes the use of short perfluorinated chains in copolymers prepared by nitroxide mediated polymerization for the use of leveling agents.

It is an object of the present invention to provide a polymeric leveling and anti-cratering agent which does not form environmentally very persistent degradation products such as perfluoro-octanoic acid but still enables manufacturing of coating, ink or adhesive compositions having very low dynamic surface tension.

According to a first aspect of the present invention, the object is solved by providing a composition, comprising
a binder resin,
a block copolymer which comprises at least a block A and a block B, wherein
the block A comprises monomer units derived from a compound selected from (meth)acrylic acid, a (meth)acrylic acid ester, a (meth)acrylamide, a vinyl aromatic compound, or any mixture thereof,
the block B comprises monomer units derived from a compound selected from a fluorinated (meth)acrylic ester having the following formula (I):

$$H_2C=CR_1(C(O)OR_{F-1}) \quad (I)$$

wherein
R1 is H or methyl; and
$R_{F-1}$ is an organic residue containing a perfluorinated $C_{4-6}$ alkyl group, i.e. —$(CF_2)_{3-5}$—$CF_3$,
a fluorinated alpha-olefin having the following formula (II):

$$H_2C=CH(R_{F-2}) \quad (II)$$

wherein $R_{F-2}$ is an organic residue containing a perfluorinated $C_{4-6}$ alkyl group, i.e. —$(CF_2)_{3-5}$—$CF_3$
or any mixture thereof.

A perfluorinated $C_{4-6}$ alkyl group is represented by the formula —$(CF_2)_{3-5}$—$CF_3$.

Preferably, $R_{F-1}$ and $R_{F-2}$, which can be the same or different, have the following formula (III):

$$—(R_2)_x—(CF_2)_{3-5}—CF_3 \quad (III)$$

wherein x is 0 or 1; and $R_2$ is a divalent non-fluorinated $C_{1-4}$ alkylene group, which can be substituted or unsubstituted.

In a preferred embodiment, $R_2$ in formula (III) is —$(CH_2)_{1-4}$—; such as —$CH_2$—; —$CH_2$—$CH_2$—; —$CH_2$—$CH_2$—$CH_2$—; or —$CH_2$—$CH_2$—$CH_2$—$CH_2$—.

In a preferred embodiment, the fluorinated (meth)acrylic ester compound of formula (I) is selected from 3,3,4,4,5,5,6,6,7,7,8,8-tridecafluorooctyl acrylate, 3,3,4,4,5,5,6,6,6-nonafluorohexyl-acrylate, or mixtures thereof.

Preferred fluorinated alpha-olefins of formula (II) include e.g. 3,3,4,4,5,5,6,6,7,7,8,8-tridecafluoro-1-octene, 3,3,4,4,5,5,6,6,6-nonafluoro-1-hexene, or any mixture thereof.

The block B may consist of monomer units derived from the fluorinated (meth)acrylic ester compound of formula (I) or from the fluorinated alpha-olefin of formula (II).

Alternatively, the block B may contain two or more different monomer units.

If the block copolymer contains two or more blocks of type "B", they may differ in block length (i.e. different number of monomer units), but preferably have the same arrangement or sequence of monomer units.

Preferably, the block B of the block copolymer has an average number of monomer units which are derived from the fluorinated (meth)acrylic ester compound of formula (I) and/or from the fluorinated alpha-olefin of formula (II) of at least 0.25, more preferably at least 0.5, or at least 1.

If the average number of monomer units of a specific block is below 1, this means that, statistically, not every polymer chain contains monomer units of said block. However, when using the block copolymer of the present invention, a reduced dynamic surface tension is still obtained at such low amount of fluorinated monomer units.

In a preferred embodiment, the block B of the block copolymer has an average number of monomer units which are derived from the fluorinated (meth)acrylic ester compound of formula (I) and/or from the fluorinated alpha-olefin of formula (II) of from 0.25 to 40, more preferably 0.5 to 30, even more preferably 1 to 20.

Preferably, block A comprises monomer units derived from a compound selected from $C_{1-18}$ (meth)acrylates, more preferably $C_{1-10}$ (meth)acrylates, especially methyl(meth)acrylate (MMA), ethyl(meth)acrylate, n-butyl(meth)acrylate, iso-butyl(meth)acrylate, t-butyl(meth)acrylate, 2-ethylhexyl(meth)acrylate, isodecyl(meth)acrylate, hydroxylfunctional (meth)acrylates like 2-hydroxyethyl(meth)acrylate, hydroxypropyl(meth)acrylate, acid functional (meth)acrylic monomers like acrylic acid or methacrylic acid, sulphonic acid containing monomers like 2-acrylamido-2-methylpropane sulfonic acid (AMPS), amino functional (meth)acrylates like dimethylaminoethylmethacrylate (DMAEMA), epoxy functional (meth)acrylates like glycidylmethacrylate (GMA), (meth)acrylates containing siloxane groups, vinyl aromatic compounds such as styrene, or any mixture thereof.

The block A may consist of monomer units derived from a compound selected from (meth)acrylic acid, a (meth)acrylic acid ester, a (meth)acrylamide, or a vinyl aromatic compound.

Alternatively, the block A may contain two or more different monomer units.

If the block copolymer contains two or more blocks of type "A", they may differ in block length (i.e. different number of monomer units), but preferably have the same arrangement or sequence of monomer units.

Preferably, the block A of the block copolymer has an average number of monomer units which are derived from a compound selected from (meth)acrylic acid, a (meth)acrylic acid ester, a (meth)acrylamide, or a vinyl aromatic compound, of at least 5, more preferably at least 10, even more preferably at least 15. In a preferred embodiment, the block A of the block copolymer has an average number of monomer units which are derived from a compound selected from (meth)acrylic acid, a (meth)acrylic acid ester, a (meth)acrylamide, or a vinyl aromatic compound, of from 5 to 1000, more preferably from 10 to 500, even more preferably from 15 to 300.

Preferably, the block copolymer has a number average molecular weight Mn of from 1000 to 100,000 g/mol, more preferably from 2,000 to 50,000 g/mol, even more preferably 3,000 to 25,000 g/mol. Other appropriate Mn ranges that can be used in the present invention are e.g. from 3,000 to 100,000 g/mol, or from 4,000 to 100,000 g/mol, or from 6,000 to 50,000 g/mol.

Preferably, the block copolymer comprises the monomer units derived from the fluorinated (meth)acrylic ester of formula (I) and/or from the fluorinated alpha-olefin of formula (II) in an amount of from 0.1 wt % to 70 wt %, more preferably from 0.5 wt % to 50 wt %, even more preferably from 1 wt % to 25 wt %.

Preferably, the block copolymer has a fluorine content of from 0.05 wt % to 35 wt %, more preferably from 0.25 wt % to 25 wt %, even more preferably from 0.5 wt % to 17 wt %.

Preferably, the block copolymer has a polydispersity index PDI (i.e. Mw/Mn) of less than 1.90, more preferably of less than 1.60, even more preferably of less than 1.40, or even less than 1.30.

The polydispersity index PDI may depend on the number of blocks being present and their arrangement in the block copolymer. If the block copolymer is linear with one block of A and one block of B, PDI may preferably be less than 1.40, more preferably less than 1.30. If the block copolymer is linear with one block of A and two blocks of B, or alternatively with one block of B and two blocks of A, PDI may preferably be less than 1.60, more preferably less than 1.50.

The block copolymer is preferably obtained by a controlled free radical polymerization (sometimes also referred to as "controlled radical polymerization").

Methods of "controlled free radical polymerization" are generally known to the skilled person.

In a preferred embodiment, the controlled free radical polymerization is selected from nitroxide-mediated controlled polymerization (NMP), atom transfer radical polymerization (ATRP), or from reversible addition-fragmentation chain transfer polymerization (RAFT). These polymerization methods and variants thereof are generally known to the skilled person.

The reversible addition-fragmentation chain transfer polymerisation RAFT using chain transfer agents which react by reversible addition-fragmentation chain transfer is described, for example, in WO-A-98/01478, WO-A-99/05099, WO-A-99/31144, and WO 2009/103613.

RAFT describes a method of polymer synthesis by radical polymerization in the presence of a free radical source and using chain transfer agents which react by reversible addition-fragmentation chain transfer. The chain transfer agent is, for example, 2-phenylprop-2-yl dithiobenzoate (Ph-C(CH$_3$,CH$_3$)—S—C(S)-Ph) or benzyl dithioacetate Ph-CH$_2$—S—C(S)—CH$_3$ as described in WO 98/01478, carbamates such as benzyl 1-pyrrolecarbodithioate, as described in WO99/31144;

alkylxanthates such as ethyl α(O-ethylxanthyl propionate), as described in WO 98/58974.

WO 96/30421 discloses a controlled polymerisation process of ethylenically unsaturated polymers, such as styrene or (meth)acrylates, by employing the Atomic Transfer Radical Polymerisation (ATRP) method. This method produces defined oligomeric homopolymers and copolymers, including block copolymers. Initiators are employed, which generate radical atoms, such as .Cl, in the presence of a redox system of transition metals of different oxidation states, e.g. Cu(I) and Cu(II), providing "living" or controlled radical polymerisation.

Details about nitroxide-mediated controlled polymerization are described e.g. in WO 2005/059048 and WO 2009/103613. The initiator compounds described therein can be used in the present invention as well.

More preferably, the controlled radical polymerization is selected from nitroxide-mediated controlled polymerization (NMP) and atom transfer radical polymerization (ATRP), even more preferably from NMP.

In a preferred embodiment, the controlled radical polymerization is a nitroxide-mediated controlled polymerization, which preferably uses a polymerization regulator system based on polymerization regulator compounds being preferably selected from one of the following formulas (IV), (V) and (VI) or based on the corresponding stable free nitroxyl radicals in conjunction with a radical source:

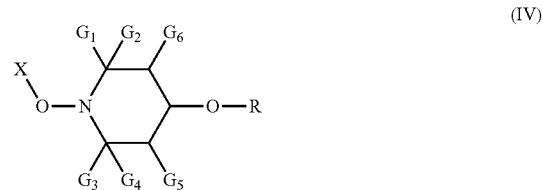

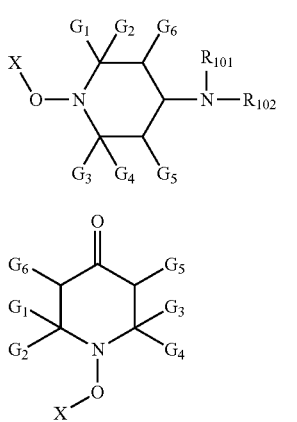

(V)

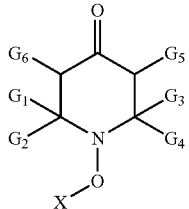

(VI)

wherein

R is hydrogen, $C_{1-18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{101}$ is $C_{1-12}$alkyl, $C_{5-7}$cycloalkyl, $C_{7-8}$aralkyl, $C_{2-18}$alkanoyl, $C_{3-5}$alkenoyl or benzoyl;

$R_{102}$ is $C_{1-18}$alkyl, $C_{5-7}$cycloalkyl, $C_{2-8}$alkenyl, which can be unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl;

$G_6$ is hydrogen, $G_5$ is hydrogen or $C_{1-4}$alkyl, $G_1$ and $G_3$ are methyl, $G_2$ and $G_4$ are ethyl or propyl, or $G_1$ and $G_2$ are methyl and G3 and G4 are ethyl or propyl; and X is selected from —CH$_2$-phenyl, CH$_3$CH-phenyl, (CH$_3$)$_2$ C-phenyl, (C$_{5-6}$cycloalkyl)$_2$CCN, (CH$_3$)$_2$CCN,

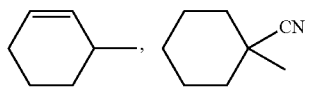

—CH$_2$CH=CH$_2$, CH$_3$CH—CH=CH$_2$, (C$_{1-4}$alkyl)CR$_{20}$—C(O)-phenyl, (C$_{1-4}$)alkyl-CR$_{20}$—C(O)—(C$_{1-4}$)alkoxy, (C$_{1-4}$)alkyl-CR$_{20}$—C(O)—(C$_{1-4}$)alkyl, (C$_{1-4}$)alkyl-CR$_{20}$—C(O)—N-di(C$_{1-4}$)alkyl, (C$_{1-4}$)alkyl-CR$_{20}$—C(O)—NH(C$_{1-4}$)alkyl, (C$_{1-4}$)alkyl-CR$_{20}$—C(O)—NH$_2$, wherein R$_{20}$ is hydrogen or (C$_{1-4}$)alkyl; and wherein any of the alkyl groups can be unsubstituted or substituted, e.g. by one or more functional groups such as hydroxyl, amino, carboxylic acid, halide, cyano, and/or carbonyl.

The above polymerization regulator compounds as well as their corresponding stable free nitroxl radicals and their preparation are described in GB 2 335 190 and GB 2 361 235.

As known to the skilled person, controlled free radical polymerization may involve using an initiator fragment IN for initiating the radical polymerization. The initiator fragment can be released from a polymerization regulator compound IN-E, e.g. from one of those described above. In formulas (IV) to (VI), radical X represents the initiator fragment IN, whereas the nitroxide radical would represent the group E.

The block copolymer can be a diblock copolymer, a triblock copolymer, or multiblock copolymer.

The block copolymer can be linear, or branched (such as star-shaped, comb-shaped, etc.).

In the present invention, the term "block copolymer" also includes a gradient and/or tapered block copolymer. This type of structured copolymer is also generally known to the skilled person. In a gradient or tapered block copolymer, there is a gradient compositional transition between blocks A and B.

In a preferred embodiment, a block can also be defined as a region of the polymer chain that is richer in fluorinated monomer than another block.

In the block copolymer of the present invention, two neighbouring blocks can be directly linked to each other. Alternatively, two neighbouring blocks can be linked to each other via a linking group LG, e.g. -A-LG-B-; -B-LG-B-; -A-LG-A-

The linking group LG can be any divalent group which may form a covalent bond to blocks A and B. Appropriate linking groups are known to the skilled person.

In a preferred embodiment, the linking group LG has the following formula (VII):

—IN$_1$'—Y'—IN$_2$'— (VII)

wherein the IN$_1$' and IN$_2$' groups, which can be the same or different, are derived from the initiator fragments IN$_1$ and IN$_2$ of the controlled free radical polymerization, and Y' is a divalent group covalently linked to the IN$_1$' and IN$_2$' groups or represents a covalent bond (e.g. α-bond or π-bond) between the IN$_1$' and IN$_2$' groups.

Preferably, the initiator fragments IN$_1$ and IN$_2$ are the same and, consequently, the IN$_1$' and IN$_2$' groups are the same as well.

The divalent group Y' can be derived from a compound Y having at least two functional groups which may react with the initiator fragments IN$_1$ and IN$_2$. Appropriate compounds having at least two functional groups are e.g. diisocyanate compounds (such as toluene diisocyanate), aliphatic polyisocyanates or isocyanurate compounds.

The linking group LG of formula (VII) can be obtained by using, in the controlled free radical polymerization, an initiator fragment IN having at least one functional group, such as hydroxyl, amino, carboxylic acid, halide, cyano, and/or carbonyl. After having initiated controlled free radical polymerization, the initiator fragment IN is covalently bonded to one end of the polymer chain. In the presence of a compound Y having two functional groups, a chemical reaction between said compound Y and two IN groups of two different polymer chains may take place, thereby bonding these polymer chains to each other via a linking group of formula (VII).

The block copolymer of the present invention may contain only one block A, or may contain two or more blocks of A. The blocks may have the same number of monomer units or may differ in block length (i.e. different number of monomer units).

The block copolymer of the present invention may contain only one block B, or may contain two or more blocks of B. The blocks may have the same number of monomer units or may differ in block length (i.e. different number of monomer units).

If the block copolymer contains at least two blocks of A and at least two blocks of B, the block copolymer may comprise the following structural element:

-B-A-LG-A-B- or -A-B-LG-B-A- wherein LG is the linking group described above, which is preferably of formula (VII).

Preferably, the amount of the block copolymer, relative to the total composition, is from 0.05 wt % to 15 wt %, more preferably from 0.075 wt % to 10 wt % and most preferred from 0.1 wt % to 5 wt %.

The binder resin can be selected from those commonly used for coating compositions. Appropriate binder resins are known to the skilled person.

The binder resin can be selected from solvent based resins, water based resins, emulsion polymers, solution polymers, or any mixture thereof.

The binder resins comprise all kinds of crosslinking mechanism and coating systems based on one-component multi-component systems, e.g. thermosetting resins, room temperature curable resins, radiation-curable resins. Also included are physically drying coating systems like thermoplastic acrylic resins.

The resins comprise state of the art polymer chemistry used in coatings, inks and adhesives: e.g. saturated polyesters, unsaturated polyesters, polyacrylates, styrene-acrylic resins, polyurethanes, epoxy resins, nitrocellulose resins, hybrid systems like polyester/polyurethanes, polyacrylate/poly-urethanes, alkyd/melamine, polyester/CAB/melamine, polyacrylate/CAB/melamine, etc. Preferred binder resins comprise powder coating resins, i.e. resin systems which are solid at room temperature and do not include a liquid carrier, e.g. thermosetting powder coatings or radiation curable powder coatings like polyester/PRIMID, polyester/TGIC, epoxy-functional polyacrylates with acidic crosslinker components, etc.

The weight ratio the block copolymer to binder resin can be varied over a broad range. Preferably, the weight ratio of block copolymer to binder resin is within the range of from 0.001 to 0.5 more preferably from 0.005 to 0.3 even more preferably from 0.01 to 0.1.

Preferably, the composition is a coating composition, an ink composition or an adhesive composition.

Exemplary compositions include a solvent-based coating composition, a water-based coating composition, a high solids coating composition, a powder coating composition, a solvent-borne ink composition, a water-borne ink composition, a UV-curable ink composition, or a UV-curable coating composition, or combinations thereof.

According to a further aspect, the present invention is directed to the use of the block copolymer described above as an anti-cratering and/or leveling and/or substrate wetting agent in coating compositions, ink compositions, or adhesive compositions.

As the block copolymer of the present invention provides a significant reduction in dynamic surface tension, it is preferably used as an anti-cratering and/or leveling agent in challenging coating systems, such as high solids coatings, powder coatings, solvent-borne inks, water-borne inks, UV inks, UV coatings and/or in high speed coating processes.

According to a further aspect, the present invention is directed to the use of the block copolymer described above for reducing dynamic surface tension in a coating composition, ink composition or adhesive composition, such as high solids coating compositions and powder coating compositions, ink compositions such as solvent-borne inks, water-borne inks, UV inks, UV coatings.

Preferably, the term "reducing dynamic surface tension" means that dynamic surface tension is lower if compared to a random but otherwise identical copolymer.

EXAMPLES

I. Measuring Methods

If not indicated otherwise, parameters defined in the present application are measured by the measuring methods described below:

Number Average Molecular Weight Mn, Polydispersity Index PDI

Mn and PDI are measured by gel permeation chromatography (GPC) with polystyrene standards. The eluent is THF.

Amount of F (in Wt %) and Amount of Fluorine-Containing Monomer Units (in Wt %) in the Block Copolymer Determined by $^1$H NMR, 400 MHz.

II. Preparation Examples

Inventive Example 1

Synthesis of a Linear A-B Block-Copolymer of n-Butyl Acrylate (nBA) and 3,3,4,4,5,5,6,6,7,7,8,8,8-Tridecafluorooctyl Acrylate (TFOA)

Synthesis of A Block

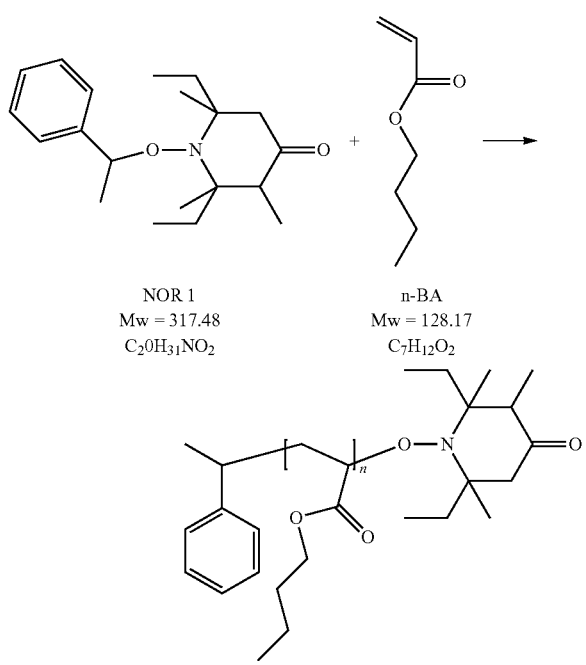

NOR 1
Mw = 317.48
$C_{20}H_{31}NO_2$ n-BA
Mw = 128.17
$C_7H_{12}O_2$

In a 5000 mL glass reactor with overhead mechanical stirrer, condenser, metering pumps, computerized temperature control and data acquisition, the following A-blocks are synthesized.

GK3023-360 (10 Units nBA)

1816.70 g of n-Butyl Acrylate (nBA, Mw 128.7 g/mol), 150.00 g of the initiator compound NOR 1 (317.48 g/mol) and 271.38 g of ethyl acetate (EtAc, Mw 88.11 g/mol) are mixed together, purged with $N_2$ and reacted for 3 h at 120° C. Residual monomer and ethyl acetate is distilled off at 105° C. and 20 mbar.

Yield: 33.3%; GPC (THF, PS-Standard, Mn=1706 g/mol, PDI=1.26, liquid)

GK3023-264 (20 Units)

1211.13 g of n-Butyl Acrylate (nBA, Mw 128.7 g/mol) and 60.00 g of the initiator compound NOR 1 (317.48 g/mol) are mixed together, purged with $N_2$ and reacted for 3.5 h at 115° C. Residual monomer is distilled off at 105° C. and 20 mbar.

Yield: 42.83%; GPC (THF, PS-Standard, Mn=2435 g/mol, PDI=1.36, viscous liquid)

GK3023-335 (35 Units)

1383.92 g of n-Butyl Acrylate (nBA, Mw 128.7 g/mol), 40.00 g of the initiator compound NOR 1 (317.48 g/mol) and 206.70 g of ethyl acetate (EtAc, Mw 88.11 g/mol) are mixed together, purged with $N_2$ and reacted for 3 h at 120° C. Residual monomer and ethyl acetate is distilled off at 105° C. and 20 mbar.

Yield: 38.3%; GPC (THF, PS-Standard, Mn=3649 g/mol, PDI=1.44, viscous liquid)

GK3023-387 (75 Units)

1211.13 g of n-Butyl Acrylate (nBA, Mw 128.7 g/mol) and 60.00 g of NOR 1 (317.48 g/mol) are mixed together, purged with N2 and reacted for 1.5 h at 115° C. A feed of 2422.26 g of nBA is fed to the reactor over 3 hours. At 125° C., the reaction continues for a further 4.5 h. Residual monomer is distilled off at 105° C. and 20 mbar.

Yield: 50.36%; GPC (THF, PS-Standard, Mn=9650 g/mol, PDI=1.21, viscous liquid)

Synthesis of B Block

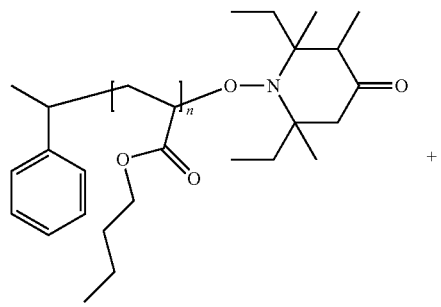

+

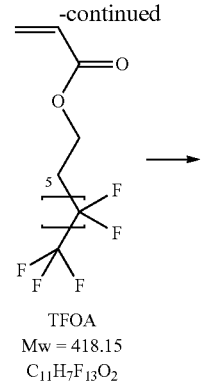

TFOA
Mw = 418.15
$C_{11}H_7F_{13}O_2$

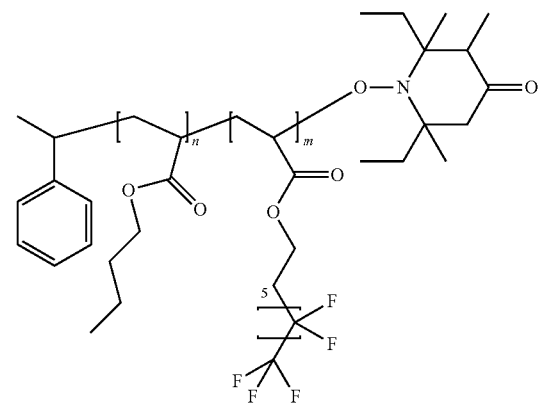

In a 5-necked 100 mL Sulfier flask with an overhead stirrer, thermometer, cooler and septum, A g of Poly-nBA (see table) and B g of 3,3,4,4,5,5,6,6,7,7,8,8,8-Tridecafluorooctyl Acrylate (TFOA, Mw 418.15 g/mol) are mixed together, purged with N2 for 30 minutes and polymerized for 8 hours at 128° C. Residual monomer is distilled off at 105° C. and 20 mbar. The polymer is characterized by GPC (THF and with PS-Standards; note: the refractive index of TFOA is negative) and $^1$H-NMR (in $CDCl_3$).

| Product | A-block Poly-nBA | A (g of A block) | B (g TFOA) | Yield (%) | Mn [a] (g/mol) | PDI [a] | wt. % TFOA [b] | wt % F in polymer [b] | Description (units of nBA:units of TFOA) [b] |
|---|---|---|---|---|---|---|---|---|---|
| GK3479-039 | GK3023-360 | 10.00 | 13.94 | 82.59 | 2029 | 1.29 | 50.90 | 30.03 | 10:3.96 |
| GK3479-040 | GK3023-360 | 15.00 | 12.54 | 88.56 | 2035 | 1.23 | 40.40 | 23.87 | 10:2.59 |
| GK3479-041 | GK3023-360 | 20.00 | 5.58 | 89.12 | 1771 | 1.22 | 19.07 | 11.25 | 10:0.90 |
| GK3479-076 | GK3023-360 | 27.00 | 3.00 | 87.93 | 2055 | 1.21 | 7.51 | 4.43 | 10:0.31 |
| GK3479-077 | GK3023-360 | 27.90 | 2.10 | 88.40 | 2016 | 1.22 | 5.91 | 3.49 | 10:0.24 |
| GK3479-044 | GK3023-264 | 20.00 | 13.94 | 95.01 | 3510 | 1.20 | 36.93 | 21.79 | 20:4.03 |
| GK3479-046 | GK3023-264 | 20.00 | 8.36 | 92.01 | 3121 | 1.22 | 24.97 | 14.73 | 20:2.29 |
| GK3494-071 | GK3023-264 | 30.00 | 4.18 | 92.44 | 3377 | 1.24 | 10.30 | 6.07 | 20:0.79 |
| GK3494-014 | GK3023-264 | 30.00 | 20.91 | 94.96 | 4331 | 1.22 | 37.22 | 21.96 | 20:4.08 |
| GK3479-080 | GK3023-264 | 45.00 | 5.00 | 93.31 | 2949 | 1.26 | 6.26 | 3.70 | 20:0.46 |
| GK3479-081 | GK3023-264 | 46.50 | 3.50 | 93.57 | 3012 | 1.26 | 4.97 | 2.93 | 20:0.36 |

-continued

| Product | A-block Poly-nBA | A (g of A block) | B (g TFOA) | Yield (%) | Mn[a] (g/mol) | PDI[a] | wt. % TFOA[b] | wt % F in polymer[b] | Description (units of nBA:units of TFOA)[b] |
|---|---|---|---|---|---|---|---|---|---|
| GK3479-043 | GK3023-335 | 30.00 | 7.84 | 94.09 | 4476 | 1.17 | 17.36 | 10.24 | 35:2.41 |
| GK3494-028 | GK3023-335 | 30.00 | 13.07 | 91.04 | 5068 | 1.16 | 28.26 | 16.67 | 35:4.53 |
| GK3479-070 | GK3023-335 | 30.00 | 2.61 | 96.33 | 5218 | 1.19 | 6.29 | 3.71 | 35:0.77 |
| GK3479-079 | GK3023-335 | 27.00 | 3.00 | 96.90 | 4869 | 1.20 | 6.21 | 3.66 | 35:0.76 |
| GK3494-026 | GK3023-387 | 50.00 | 10.59 | 94.47 | 8638 | 1.16 | 14.89 | 8.78 | 75:4.15 |
| GK3494-027 | GK3023-387 | 50.00 | 20.91 | 91.77 | 9119 | 1.18 | 24.86 | 14.67 | 75:7.85 |
| GK3479-042 | GK3023-387 | 50.00 | 6.27 | 98.86 | 8223 | 1.19 | 10.22 | 6.03 | 75:2.70 |
| GK3479-047 | GK3023-387 | 50.00 | 2.09 | 98.93 | 8012 | 1.19 | 3.65 | 2.16 | 75:0.90 |
| GK3479-078 | GK3023-387 | 45.00 | 5.00 | 97.24 | 9907 | 1.23 | 7.81 | 4.61 | 75:2.01 |
| GK3479-48[c] | GK3023-387 | 40.00 | 14.65 | 83.99 | 7803 | 1.19 | 5.19 | 3.06 | 75:1.30 |
| GK3479-082 | GK3023-387 | 46.50 | 3.50 | 98.11 | 9476 | 1.22 | 5.80 | 3.42 | 75:1.46 |

[a] by GPC with polystyrene standards
[b] by H[1] NMR
[c] Polymerization at 115° C. for 2 hours.

Comparative Example 2

Synthesis of a Linear, Low Polydispersity, Random Copolymer of n-Butyl Acrylate (nBA) and 3,3,4,4,5,5,6,6,7,7,8,8,8-Tridecafluoroctyl Acrylate (TFOA)

GK3479-027

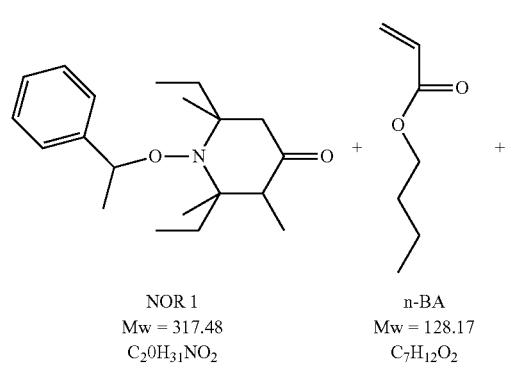

NOR 1
Mw = 317.48
$C_{20}H_{31}NO_2$ n-BA
Mw = 128.17
$C_7H_{12}O_2$

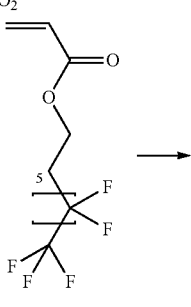

TFOA
Mw = 418.15
$C_{11}H_7F_{13}O_2$

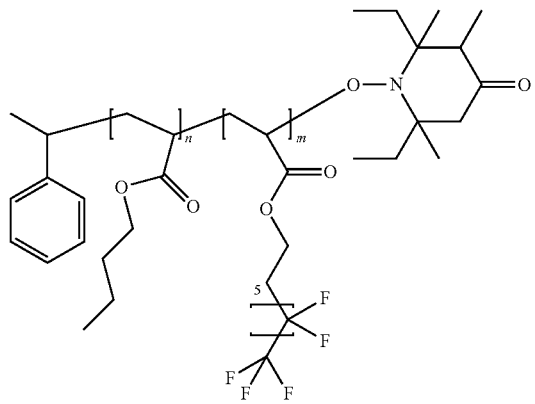

In a 5-necked 100 mL Sulfier flask with an overhead stirrer, thermometer, cooler and septum, C 65.70 g of n-Butyl Acrylate (nBA, Mw 128.7 g/mol), D 3.70 g of 3,3,4,4,5,5,6,6,7,7,8,8,8-Tridecafluoroctyl Acrylate (TFOA, Mw 418.15 g/mol) and E 2.50 g of NOR 1 (317.48 g/mol) are mixed together, purged with N2 for 30 minutes and polymerized for 3-4 hours at 125° C. Residual monomer is distilled off at 95° C. and 10 mbar. The polymer is characterized by GPC (THF and with PS-Standards) and $^1$H-NMR (in CDCl$_3$).

| Product | C (g of nBA) | D (g of TFOA) | E (g NOR1) | Yield (%) | Mn[a] (g/mol) | PDI[a] | wt. % TFOA[b] | wt % F in polymer[b] |
|---|---|---|---|---|---|---|---|---|
| GK3479-027 | 65.70 | 3.70 | 2.50 | 60.14 | 3724 | 1.20 | 8.02 | 4.73 |
| GK3479-026 | 62.00 | 7.40 | 2.50 | 61.80 | 4031 | 1.23 | 14.27 | 8.42 |
| GK3479-024 | 58.00 | 11.40 | 2.50 | 60.71 | 3814 | 1.25 | 19.46 | 11.48 |
| GK3479-022 | 47.79 | 2.67 | 2.50 | 44.87 | 2217 | 1.30 | 12.55 | 7.41 |
| GK3479-021 | 45.06 | 5.40 | 2.50 | 47.76 | 2298 | 1.27 | 17.73 | 10.46 |
| GK3479-020 | 42.38 | 8.08 | 2.50 | 46.11 | 2296 | 1.28 | 21.53 | 12.70 |

[a] by GPC with polystyrene standards
[b] by H$^1$ NMR

Comparative Example 3

Synthesis of Random Copolymer of n-Butyl Acrylate (nBA) and 3,3,4,4,5,5,6,6,7,7,8,8,8-Tridecafluoroctyl Acrylate (TFOA) by free radical polymerization

GK3365-133

In a 5-necked 200 mL Sulfier flask with an overhead stirrer, thermometer, cooler and septum, 50.00 g of sec-Butanol (Mw 74.12 g/mol) is purged with N2 for 30 minutes and heated to 100° C. A pre-mixed feed of A 5.00 g of 3,3,4,4,5,5,6,6,7,7,8,8,8-Tridecafluoroctyl Acrylate (TFOA, Mw 418.15 g/mol), B 88.54 g of n-Butyl Acrylate (nBA, Mw 128.7 g/mol) and C 6.46 g of tert-butyl Peroxy-2-ethylhexanoate (tBpOEH, Mw 216.32 g/mol) is fed to the reactor over 3 hours. After the completion of the feed, the reaction continues to react for a further 3 hours. The solvent is distilled off at 100° C. and 10 mbar. The polymer is characterized by GPC (THF and with PS-Standards) and $^1$H-NMR (in CDCl$_3$).

| Product | B (g of nBA) | A (g of TFOA) | C (g of tBpOEH) | Mn[a] (g/mol) | PDI[a] | wt. % TFOA[b] | wt % F in polymer[b] |
|---|---|---|---|---|---|---|---|
| GK3365-133 | 88.54 | 5.00 | 6.46 | 2065 | 1.56 | 5.35 | 2.95 |
| GK3365-134 | 83.54 | 10.00 | 6.46 | 2072 | 1.56 | 10.69 | 5.90 |
| GK3365-135 | 78.54 | 15.00 | 6.46 | 2043 | 1.50 | 16.04 | 8.85 |
| GK3365-136 | 88.54 | 5.00 | 3.00 | 2604 | 1.70 | 5.35 | 2.95 |

Inventive Example 4

Synthesis of a Linear B-A-B Block-Copolymer of n-Butyl Acrylate (nBA, A-block) and 3,3,4,4,5,5,6,6,7,7,8,8,8-Tridecafluoroctyl Acrylate (TFOA, B-block)

Synthesis of A (Interior) Block

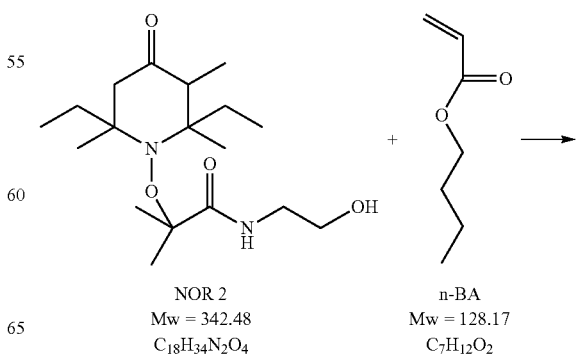

NOR 2
Mw = 342.48
C$_{18}$H$_{34}$N$_2$O$_4$ n-BA
Mw = 128.17
C$_7$H$_{12}$O$_2$

-continued

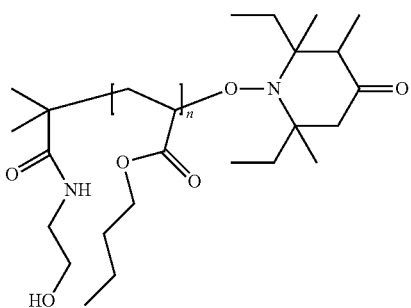

In a 5000 mL glass reactor with overhead mechanical stirrer, condenser, metering pumps, computerized temperature control and data acquisition, the following A-blocks-precursors are synthesized.

GK3023-389 (75 Units)

2165.22 g of n-Butyl Acrylate (nBA, Mw 128.7 g/mol) and 80.00 g of the initiator compound NOR 2 (342.48 g/mol) are mixed together, purged with N2 and reacted for 1.5 h at 115° C. A feed of 1624.54 g of nBA was fed to the reactor over 5 hours. At 125° C., the reaction continues for a further 2 h. Residual monomer is distilled off at 105° C. and 20 mbar.

Yield: 50.29%; GPC (THF, PS-Standard, Mn=10740 g/mol, PDI=1.19, viscous liquid)

GK3023-287 (15 Units)

2944.4 g of n-Butyl Acrylate (nBA, Mw 128.7 g/mol) and 180 g of NOR 2 (342.48 g/mol) are mixed together, purged with N2 and reacted for 3.5 h at 115° C. Residual monomer is distilled off at 105° C. and 20 mbar.

Yield: 28.84%; GPC (THF, PS-Standard, Mn=2172 g/mol, PDI=1.25, viscous liquid)

GK3023-010 (35 Units)

In a 2000 mL glass reactor with overhead mechanical anchor stirrer, condenser and metering pumps 561.36 g of n-Butyl Acrylate (nBA, Mw 128.7 g/mol) and 50.00 g of NOR 2 (342.48 g/mol) are mixed together, purged with N2 and reacted for 2 h at 115° C. A feed of 748.48 g of nBA is fed to the reactor over 6 hours. At 120° C., the reaction continues for a further 6 h. Residual monomer is distilled off at 105° C. and 20 mbar.

Yield: 49.67%; GPC (THF, PS-Standard, Mn=7739 g/mol, PDI=1.14, viscous liquid)

Coupling to Synthesize Difunctional A-Blocks

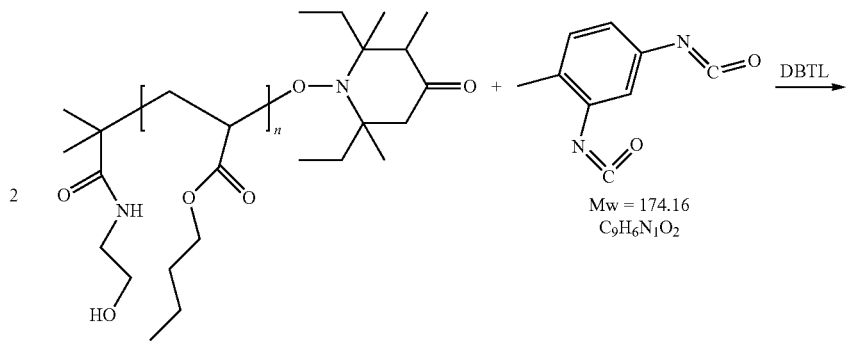

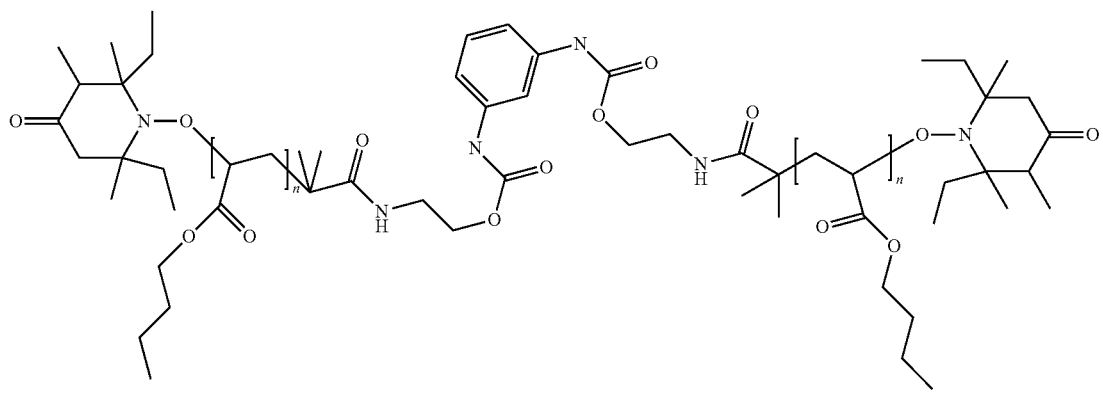

In a 5-necked 200 mL Sulfier flask with an overhead stirrer, thermometer, cooler and septum, F g of Poly-nBA precursors (see table) and G g of tolylene-2,4-diisocyanate (TDI, Mw 174.16 g/mol) are mixed together and purged with N2 for 30 minutes. The inner temperature is raised to 60° C. and a few drops of dibutyltin dilaurate (DBTL, Mw 631.56, 10% solution in butyl acetate) are added. The coupling reaction continues for 4 hours at 60° C. The polymer is characterized by GPC (THF and with PS-Standards and $^1$H-NMR (in CDCl$_3$).

| Product | A-block Poly-nBA | F (g of A block) | G (g TDI) | Mn $^a$ (g/mol) | PDI $^a$ | Description (units of nBA: units of TFOA) $^b$ |
|---|---|---|---|---|---|---|
| GK3041-283 | GK3023-389 | 1200 | 11.00 | 17592 | 1.21 | NOR-BA(150)-NOR |
| GK3479-061 | GK3023-010 | 120 | 2.39 | 8947 | 1.17 | NOR-BA(70)-NOR |
| GK3479-062 | GK3023-287 | 100 | 4.79 | 4186 | 1.13 | NOR-BA(30)-NOR |

Synthesis of B Block

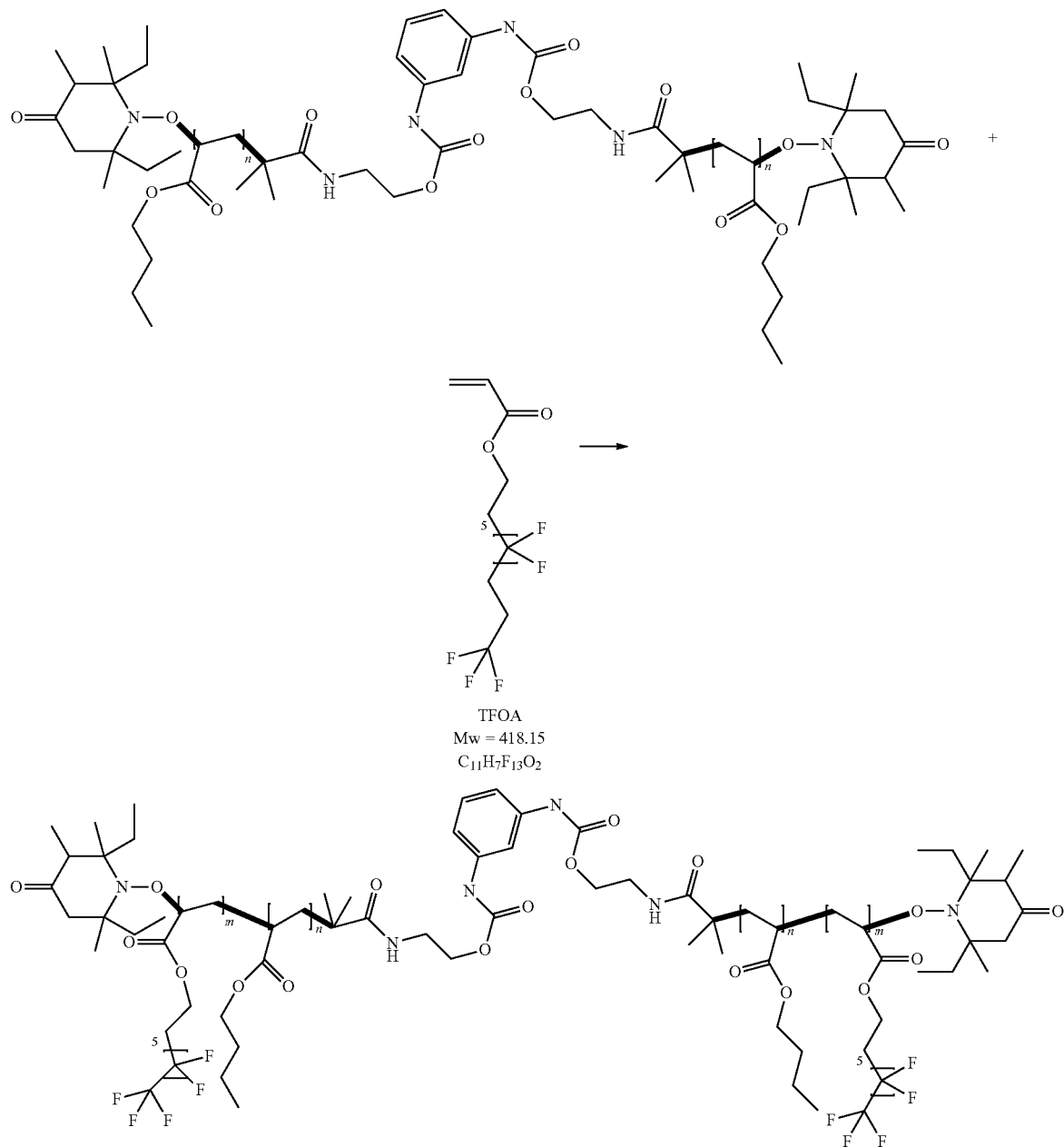

In a 5-necked 100 mL Sulfier flask with an overhead stirrer, thermometer, cooler and septum, H g of di-functional poly nBA (see table) and I g of 3,3,4,4,5,5,6,6,7,7,8,8,8-Tridecafluorooctyl Acrylate (TFOA, Mw 418.15 g/mol) are mixed together, purged with N2 for 30 minutes and polymerized for 8 hours at 128° C. Residual monomer is distilled off at 105° C. and 20 mbar. The polymer is characterized by GPC (THF and with PS-Standards; note: the refractive index of TFOA is negative) and $^1$H-NMR (in CDCl$_3$).

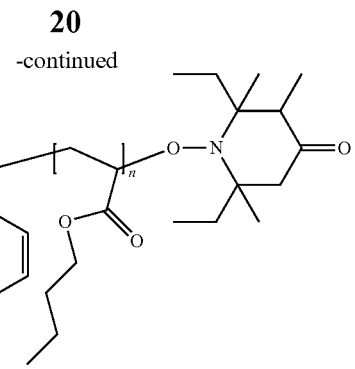

| Product | A-block Poly-nBA | H (g of A block) | I (g TFOA) | Yield (%) | Mn [a] (g/mol) | PDI [a] | wt. % TFOA [b] | wt % F in polymer [b] | Idealized Description (TFOA:nBA:TFOA) [b] |
|---|---|---|---|---|---|---|---|---|---|
| 3479-072 | GK3041-283 | 40.00 | 5.02 | 95.02 | 14434 | 1.40 | 6.49 | 3.83 | 2.93:150:2.93 |
| 3479-073 | GK3041-283 | 40.00 | 8.36 | 91.92 | 16021 | 1.40 | 10.02 | 5.91 | 4.89:150:4.89 |
| 3479-074 | GK3041-283 | 40.00 | 1.67 | 99.53 | 16734 | 1.24 | 3.55 | 2.10 | 0.98:150:0.98 |
| 3479-075[c] | GK3041-283 | 30.00 | 7.52 | 83.87 | 15757 | 1.36 | 4.67 | 2.75 | 5.86:150:5.86 |
| 3479-067 | GK3479-061 | 30.00 | 7.53 | 81.23 | 8445 | 1.45 | 1.59 | 0.94 | 2.79:70:2.79 |
| 3479-068[d] | GK3479-061 | 30.00 | 15.06 | 83.84 | 9071 | 1.47 | 20.59 | 12.15 | 5.59:70:5.59 |
| 3479-065 | GK3479-062 | 15.00 | 8.36 | 94.04 | 4749 | 1.39 | 31.72 | 18.71 | 2.79:30:2.79 |
| 3479-066 | GK3479-062 | 20.00 | 3.72 | 94.70 | 3815 | 1.44 | 10.96 | 6.47 | 0.93:30:0.93 |

[a] by GPC with polystyrene standards
[b] based on solids content
[c] Polymerized with a maximum temperature of 115° C. in 1 hour.
[d] Polymerized with a maximum temperature of 115° C. in 22 hours.

Inventive Example 5

Synthesis of a Linear A-B Block-Copolymer of n-Butyl Acrylate (nBA) and 3,3,4,4,5,5,6,6,6-Nonafluorhexyl Acrylate (NNFHA)

Synthesis of A Block

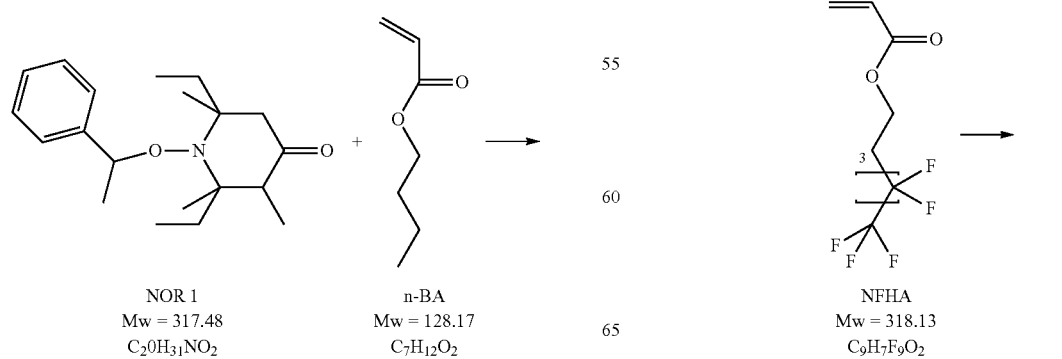

NOR 1
Mw = 317.48
C$_{20}$H$_{31}$NO$_2$ n-BA
Mw = 128.17
C$_7$H$_{12}$O$_2$

The same A-blocks as those described in Example 1 are used as the starting block for the chain extension with NFHA monomer.

Synthesis of B Block

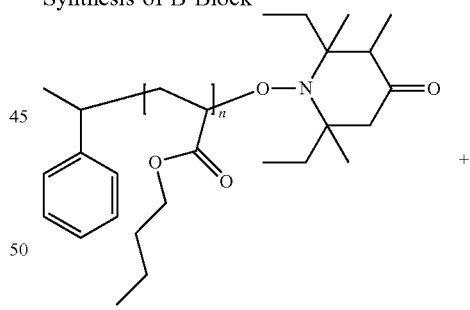

+

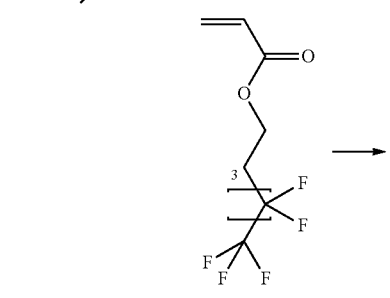

NFHA
Mw = 318.13
C$_9$H$_7$F$_9$O$_2$

-continued

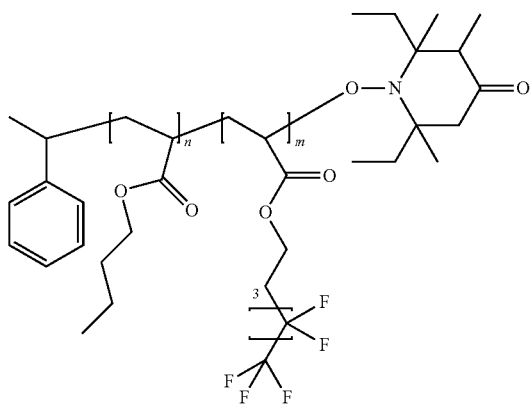

In a 5-necked 100 mL Sulfier flask with an overhead stirrer, thermometer, cooler and septum, A g of Poly-nBA (see table) and B g of 3,3,4,4,5,5,6,6,6-Nonafluorhexyl Acrylate (NFHA, Mw 318.13 g/mol) are mixed together, purged with N2 for 30 minutes and polymerized for 8 hours at 128° C. Residual monomer is distilled off at 105° C. and 20 mbar. The polymer is characterized by GPC (THF and with PS-Standards; note: the refractive index of NFHA is negative) and $^1$H-NMR (in CDCl$_3$).

Comparative Example 6

Synthesis of a Linear, Low Polydispersity, Random Copolymer of n-Butyl Acrylate (nBA) and 3,3,4,4,5,5,6,6,6-Nonafluorhexyl Acrylate (NFHA)

GK3479-202

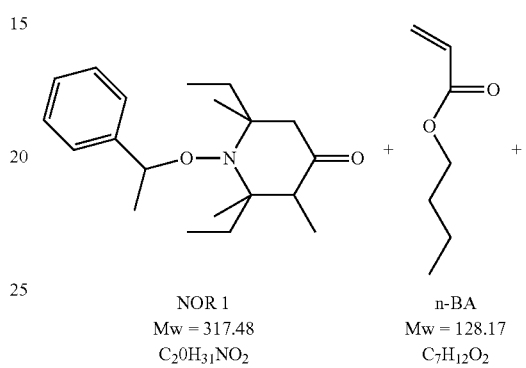

NOR 1
Mw = 317.48
C$_{20}$H$_{31}$NO$_2$ n-BA
Mw = 128.17
C$_7$H$_{12}$O$_2$

| Product | A-block Poly-nBA | A (g of A block) | B (g NFHA) | Yield (%) | Mn$^a$ (g/mol) | PDI$^a$ | wt. % NFHA$^b$ | wt % F in polymer$^b$ | Description (units of nBA:units of NFHA)$^b$ |
|---|---|---|---|---|---|---|---|---|---|
| GK3479-143 | GK3023-360 | 10.00 | 10.60 | 92.25 | 2803 | 1.22 | 29.78 | 45.78 | 10:4.24 |
| GK3479-144 | GK3023-360 | 15.00 | 9.54 | 91.54 | 2496 | 1.21 | 19.29 | 32.24 | 10:2.39 |
| GK3479-186 | GK3023-360 | 20.00 | 7.85 | 89.70 | 2281 | 1.24 | 13.12 | 23.12 | 10:1.51 |
| GK3479-185 | GK3023-360 | 20.00 | 4.24 | 88.60 | 2057 | 1.25 | 6.10 | 11.46 | 10:0.65 |
| GK3479-183 | GK3023-264 | 30.00 | 14.00 | 91.55 | 3664 | 1.25 | 14.20 | 26.79 | 20:3.31 |
| GK3479-184 | GK3023-264 | 30.00 | 9.54 | 92.36 | 3386 | 1.26 | 11.74 | 22.72 | 20:2.66 |
| GK3479-181 | GK3023-335 | 30.00 | 8.75 | 93.49 | 5620 | 1.18 | 6.49 | 13.87 | 35:2.43 |
| GK3479-182 | GK3023-335 | 30.00 | 5.96 | 93.06 | 5405 | 1.18 | 3.37 | 7.48 | 35:1.22 |
| GK3479-145 | GK3023-387 | 35.00 | 11.13 | 94.43 | 11084 | 1.28 | 8.55 | 18.35 | 75:7.01 |
| GK3479-179 | GK3023-387 | 50.00 | 11.82 | 95.24 | 11016 | 1.3 | 7.09 | 15.50 | 75:5.72 |
| GK3494-50 | GK3023-387 | 50.00 | 7.95 | 96.20 | 98040 | 1.29 | 9.07 | 4.81 | 75:3.11 |
| GK3479-180 | GK3023-387 | 50.00 | 7.03 | 95.43 | 2803 | 1.22 | 3.80 | 8.67 | 75:2.96 |

$^a$ by GPC with polystyrene standards
$^b$ by H$^1$ NMR

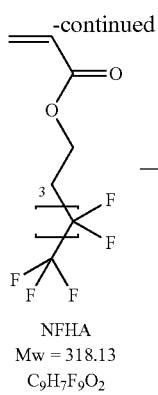

NFHA
Mw = 318.13
C₉H₇F₉O₂

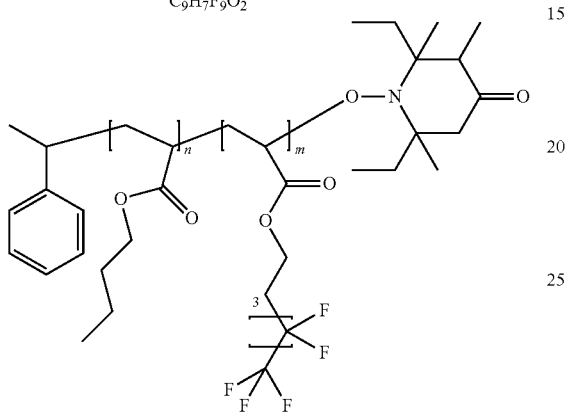

In a 5-necked 100 mL Sulfier flask with an overhead stirrer, thermometer, cooler and septum, C 50.86 g of n-Butyl Acrylate (nBA, Mw 128.7 g/mol), D 9.70 g of 3,3,4,4,5,5,6,6,6-Nonafluorhexyl Acrylate (NFHA, Mw 318.13 g/mol) and E 3.00 g of NOR 1 (317.48 g/mol) are mixed together, purged with N2 for 30 minutes and polymerized for 3-4 hours at 125° C. Residual monomer is distilled off at 95° C. and 10 mbar. The polymer is characterized by GPC (THF and with PS-Standards) and $^1$H-NMR (in CDCl$_3$).

| Product | C (g of nBA) | D (g of NFHA) | E (g NOR1) | Yield (%) | Mn [a] (g/mol) | PDI [a] | wt. % NFHA [b] | wt % F in polymer [b] |
|---|---|---|---|---|---|---|---|---|
| GK3479-202 | 50.86 | 9.70 | 3.00 | 50.79 | 2786 | 1.25 | 21.01 | 11.14 |
| GK3479-203 | 54.07 | 6.48 | 3.00 | 51.94 | 2896 | 1.19 | 17.39 | 9.22 |
| GK3479-204 | 57.35 | 3.20 | 3.00 | 49.08 | 2847 | 1.23 | 12.36 | 6.55 |
| GK3479-205 | 50.86 | 9.70 | 0.95 | 49.75 | 8146 | 1.18 | 19.62 | 10.40 |
| GK3479-206 | 54.07 | 6.48 | 0.95 | 51.24 | 8189 | 1.19 | 18.96 | 10.05 |
| GK3479-207 | 57.35 | 3.20 | 0.95 | 52.87 | 8552 | 1.21 | 5.36 | 2.84 |

[a] by GPC with polystyrene standards
[b] by H$^1$ NMR

Comparative Example 7

Synthesis of Random Copolymer of n-Butyl Acrylate (nBA) and 3,3,4,4,5,5,6,6,6-Nonafluorhexyl Acrylate (NFHA) by Free Radical Polymerization

GK3365-207

In a 5-necked 200 mL Sulfier flask with an overhead stirrer, thermometer, cooler and septum, 50.00 g of sec-Butanol (Mw 74.12 g/mol) is purged with N2 for 30 minutes and heated to 100° C. A pre-mixed feed of A 5.00 g of 3,3,4,4,5,5,6,6,6-Nonafluorhexyl Acrylate (NFHA, Mw 318.13 g/mol), B 88.54 g of n-Butyl Acrylate (nBA, Mw 128.7 g/mol) and 6.46 g of tert-butyl Peroxy-2-ethylhexanoate (tBpOEH, Mw 216.32 g/mol) is fed to the reactor over 3 hours. After the completion of the feed, the reactioncontinues to react for a further 3 hours. The solvent is distilled off at 100° C. and 10 mbar. The polymer is characterized by GPC (THF and with PS-Standards) and ¹H-NMR (in CDCl₃).

| Product | B (g of nBA) | A (g of NFHA) | Yield (%) | Mn $^a$ (g/mol) | PDI $^a$ | wt. % NFHA $^b$ | wt % F in polymer $^b$ |
|---|---|---|---|---|---|---|---|
| GK3365-207 | 88.54 | 5.00 | 6.46 | 1656 | 1.59 | 5.35 | 2.84 |
| GK3365-208 | 83.54 | 10.00 | 6.46 | 1666 | 1.60 | 10.69 | 5.67 |
| GK3365-209 | 78.54 | 15.00 | 6.46 | 1699 | 1.61 | 16.04 | 8.50 |
| GK3365-210 | 73.54 | 20.00 | 6.46 | 1606 | 1.65 | 21.38 | 11.33 |
| GK3365-211 | 88.54 | 5.00 | 2.00 | 2501 | 2.16 | 5.35 | 2.84 |
| GK3365-212 | 83.54 | 10.00 | 2.00 | 2318 | 1.92 | 10.69 | 5.67 |

Inventive Example 8

Synthesis of a Linear A-B Block-Copolymer of n-Butyl Acrylate (nBA) and 3,3,4,4,5,5,6,6,7,7,8,8,8-Tridecafluor-1-octene (TFO)

Synthesis of A Block

The same A-blocks as those described in Example 1 are used as the starting block for the chain extension with TFO monomer.

Synthesis of B Block

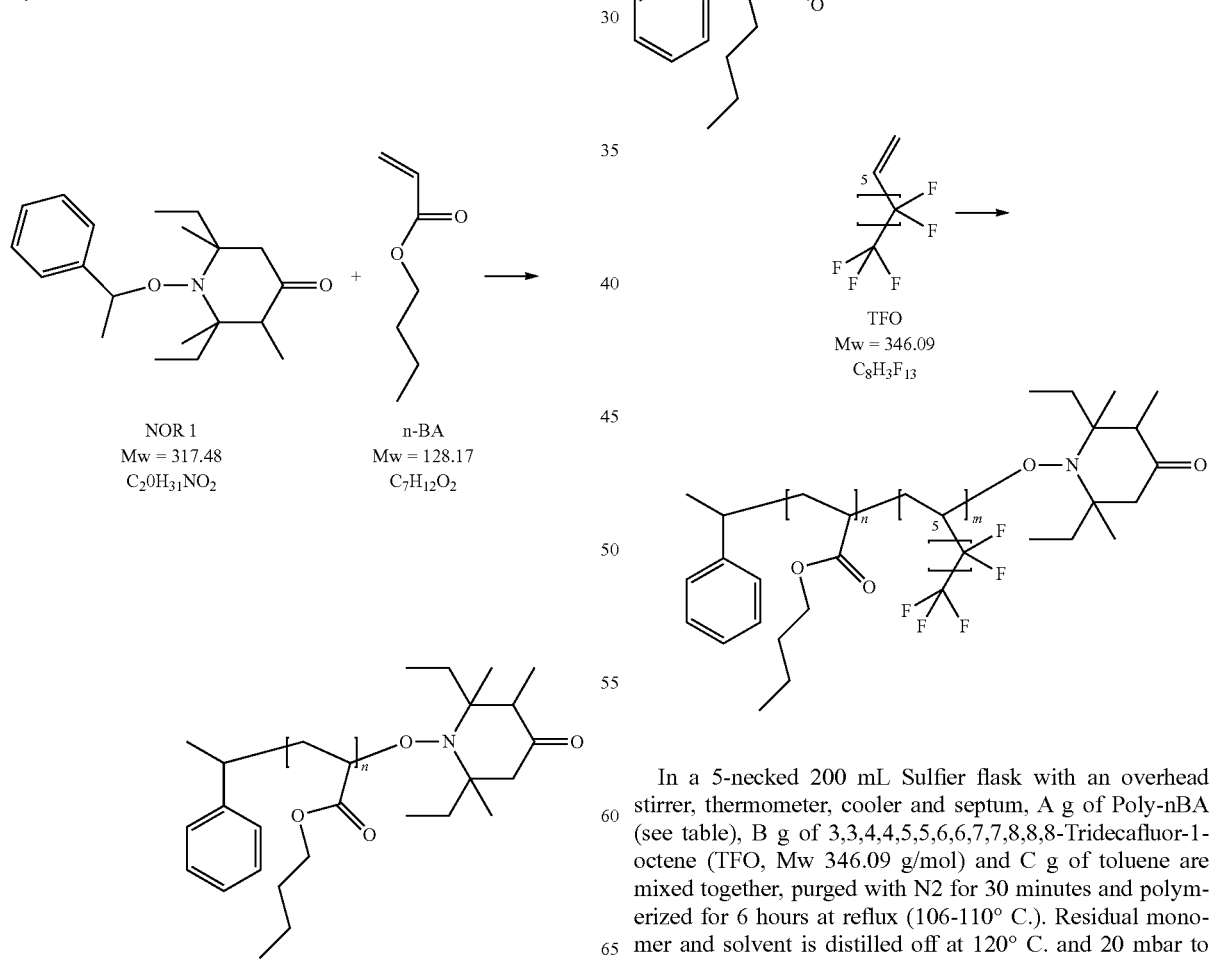

In a 5-necked 200 mL Sulfier flask with an overhead stirrer, thermometer, cooler and septum, A g of Poly-nBA (see table), B g of 3,3,4,4,5,5,6,6,7,7,8,8,8-Tridecafluor-1-octene (TFO, Mw 346.09 g/mol) and C g of toluene are mixed together, purged with N2 for 30 minutes and polymerized for 6 hours at reflux (106-110° C.). Residual monomer and solvent is distilled off at 120° C. and 20 mbar to >99%. The polymer is characterized by a mass balance of the distillate.

| Product | A-block Poly-nBA | A (g of A block) | B (g TFO) | C (g Toluene) | wt. % TFO | wt % F in polymer |
|---|---|---|---|---|---|---|
| GM0800-0012 | GK3023-360 | 30.00 | 69.22 | 30.00 | 17.81 | 12.64 |
| GM0800-0013 | GK3023-360 | 25.00 | 115.36 | 25.00 | 17.81 | 12.64 |

III. Application Examples

Static Surface Tension:

Static surface tension is measured using an OCA 20 (Dataphysics) at concentrations from 1-10 w % in xylene using the hanging-drop method.

TABLE 1.1

Static surface tension

| Example type | conc (w %) | w % TFOA | surface tension (mN/m) 10 | surface tension (mN/m) 1 |
|---|---|---|---|---|
| comparative | Xylol (blank) | | 28.62 | 28.62 |
| | GK3479/022 | 12.6 | 28.45 | 28.98 |
| | GK3479/021 | 17.7 | 27.83 | 29.03 |
| | GK3479/020 | 21.5 | 27.1 | 28.93 |
| inventive | GK3479/047 | 3.7 | 28.22 | 28.98 |
| | GK3479/042 | 10.2 | 20.76 | 25.93 |
| | GK3494/026 | 14.9 | 18.55 | 21.29 |
| | GK3494/027 | 24.9 | 18.34 | 19.62 |

At comparable amounts of TFOA w % (GK3479/022 as a comparative example and GK3479-042 as an inventive example), a much lower static surface tension in xylene are clearly observed (28.98 mN/m and 25.93 mN/m respectively at 1 w % in xylene).

Dynamic Surface Tension:

(i) With block B containing fluorinated (meth)acrylic ester derived units

Dynamic surface tension is measured using a bubble pressure tensiometer (Sita) at concentrations of 0.25% 0.5 w % in the A component of a solventbased 2K-PU. Bubble life times are measured from 80 msec up to 10 sec.

A component 2K PU:

TABLE 2.1

| 2K-PU Component A | | | | |
|---|---|---|---|---|
| Raw material | Identity | Weight in g. | 0.25 wt % Additive | 0.5 wt % Additive |
| Macrynal SM510/60LG | Acrylic resin solution | 89.0 | | |
| Butyl acetate | Solvent | 11.0 | | |
| Efka ® 2018N | | 8.0 | | |

TABLE 2.1-continued

| 2K-PU Component A | | | | |
|---|---|---|---|---|
| Raw material | Identity | Weight in g. | 0.25 wt % Additive | 0.5 wt % Additive |
| Formulation | | 108.0 | 7.38 | 7.36 |
| Additive | | | 0.025 | 0.05 |
| Sample size | | | 7.405 | 7.41 |

Efka 2018N is a commercially available defoamer.

At a very short bubble life time, a clear advantage (lower dynamic surface tension values) could be observed looking at same w % F-Monomer and 0.5 w % addition levels.

| Inventive examples | GK3479/047 | GK3479/042 | GK3494/026 | GK3494/027 |
|---|---|---|---|---|
| DST at 80 ms, 0.5 w % addition level | 73.1 | 63.3 | 56.2 | 55.2 |
| w % TFOA | 3.7 | 10.2 | 14.9 | 24.9 |

| Comparative examples | GK3479/022 | GK3479/021 | GK3479/020 | Efka 3600 | GK3365/135 |
|---|---|---|---|---|---|
| DST at 80 ms, 0.5 w % addition level | 74.7 | 70.8 | 64.9 | 72.8 | 65.1 |
| w % TFOA | 12.6 | 17.7 | 21.5 | 14.2 | 16 |

(ii) with Block B Containing Fluorinated Alpha-Olefin Derived Units

Dynamic surface tension is measured using a bubble pressure tensiometer (Sita) at concentrations of 0.1% 1.0 w % in the A component of a solventbased 2K-PU. Bubble life times are measured from 80 msec up to 10 sec. In the following test series the commercial leveling additive EFKA 3600N is used a reference.

A component 2K PU:

TABLE 2.1

| 2K-PU Component A | | | |
|---|---|---|---|
| Raw material | Identity | Weight in g. | 0.25 wt % Additive |
| Macrynal SM510/60LG | Acrylic resin solution | 89.0 | |
| Butyl acetate | Solvent | 11.0 | |

TABLE 2.1-continued

| 2K-PU Component A | | | |
|---|---|---|---|
| Raw material | Identity | Weight in g. | 0.25 wt % Additive |
| Formulation | | 100.0 | 19.95 |
| Additive | | | 0.05 |
| Sample size | | | 20.00 |

At a very short bubble life time, a clear advantage (lower dynamic surface tension values) could be observed compared to the commercial benchmark at 0.25 w % addition levels.

| Inventive examples | GM800-012 | GM800-013 |
|---|---|---|
| DST at 80 ms, 0.25 w % addition level | 72.4 | 70.9 |

| Comparative examples | Efka 3600N |
|---|---|
| DST at 80 ms, 0.25 w % addition level | 80.3 |

The results are also shown in FIG. 1.

Anticratering Test:

The formulation, according to table 3.1, is treated for about one hour on the roll bench and finally shaken by hand until homogenous. The amount of component A indicated in table 3.2 is added in 20 ml glass jar with the appropriate amount of component B. The sample is immediately shaken by hand until homogenous and applied on a PET foil. A draw down of the mixture with 75 μm wire bar at speed 20 mm/sec is prepared. The sample is checked for craters and haze on the panels after drying over night.

TABLE 3.1

| 2K-PU Component A | | | | | | | |
|---|---|---|---|---|---|---|---|
| Raw material | Identity | Weight in g. | 0.1 wt % Additive | 0.25 wt % Additive | 0.5 wt % Additive | 0.75 wt % Additive | 1 wt % Additive |
| Macrynal SM510/60LG | Acrylic resin solution | 89.0 | | | | | |
| Butyl acetate | Solvent | 10.5 | | | | | |
| Tinstab BL 277 1% in Butyl acetate | Di-n-Butyltin dilaurate | 0.5 | | | | | |
| Efka ® 2018N | | 8.0 | | | | | |
| Formulation | | 108.0 | 7.39 | 7.38 | 7.36 | 7.35 | 7.33 |
| Additive | | | 0.01 | 0.025 | 0.05 | 0.075 | 0.1 |
| Sample size | | | 7.40 | 7.405 | 7.41 | 7.425 | 7.43 |

TABLE 3.2

| 2K-PU Component B | | | | | | | |
|---|---|---|---|---|---|---|---|
| Raw material | Identity | blank | 0.1 wt % Additive | 0.25 wt % Additive | 0.5 wt % Additive | 0.75 wt % Additive | 1 wt % Additive |
| Desmodur N75 | Hardener (Resin) | 2.60 | 2.60 | 2.59 | 2.59 | 2.57 | 2.57 |
| Component A | | 7.40 | 7.40 | 7.405 | 7.41 | 7.425 | 7.43 |
| Sample size | | 10 | 10 | 10 | 10 | 10 | 10 |

Mixing ratio: A:B=100:35 (36 round)

TABLE 3.3

| Anticrater performance in 2K-PU | | | | | | | | | | |
|---|---|---|---|---|---|---|---|---|---|---|
| | | | 0.1 wt % | | 0.25 wt % | | 0.5 wt % | | 1.0 wt % | |
| Examp. Type | Sample | wt % TFOA | Craters | Gloss 20° | Crat. | Gloss 20° | Crat. | Gloss 20° | Crat. | Gloss 20° |
| comparative | Blank[a] | | 8 | 158 | | | | | | |
| | GK3479/020 | 21.5 | 1 | 165 | 1 | 93.7 | 1 | 164 | 1 | 80.2 |
| | GK3479/021 | 17.7 | 4 | 165 | 1 | 162 | 1 | 125 | 1 | 118 |
| | GK3479/022 | 12.6 | 8 | 165 | 8 | 98.1 | 8 | 125 | 2 | 109 |
| inventive | GK3494/027 | 24.9 | n/a | 150 | 2 | 105 | 3 | 122 | 3 | 143 |
| | GK3494/026 | 14.9 | 2 | 163 | 3 | 136 | 3 | 92 | 3 | 150 |
| | GK3479/042 | 10.2 | 3 | 148 | 2 | 127 | 1 | 155 | 1 | 93.7 |
| | GK3479/047 | 3.7 | 8 | 163 | 4 | 163 | 2 | 128 | 2 | 148 |
| comparative | GK3365/135 | 16.1 | 2 | 158 | 7 | 138 | 7 | 157 | 4 | 123 |
| | GK3365/134 | 10.7 | 8 | 164 | 5 | 158 | 3 | 152 | 1 | 162 |
| | GK3365/133 | 5.3 | 8 | 163 | 6 | 130 | 3 | 163 | 2 | 159 |

[a]Blank contains no additive.
1 indicates no craters and 8 indicates many craters.

The invention claimed is:
1. A composition, comprising:
a binder resin; and
a block copolymer comprising:
a block A and a block B, wherein
the block A comprises monomer units derived from a compound selected from (meth)acrylic acid, a (meth)acrylic acid ester, a (meth)acrylamide, a vinyl aromatic compound, or a mixture thereof, and
the block B comprises monomer units derived from a compound selected from a
a fluorinated alpha-olefin having the following formula (II):

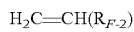 (II)

wherein $R_{F-2}$ is an organic residue containing a perfluorinated $C_{4-6}$ alkyl group.

2. The composition according to claim 1, wherein $R_{F-2}$ is of formula (III):

 (III)

wherein x is 0 or 1, and $R_2$ is a divalent non-fluorinated $C_{1-4}$ alkylene group.

3. The composition according to claim 1, wherein the block B has an average number of monomer units which are derived from the fluorinated alpha-olefin of formula (II) of at least 0.25.

4. The composition according to claim 1, wherein the block A has an average number of monomer units which are derived from a compound selected from (meth)acrylic acid, a (meth)acrylic acid ester, a (meth)acrylamide, or a vinyl aromatic compound, of at least 5.

5. The composition according to claim 1, wherein
the block copolymer has a number average molecular weight Mn of from 1000 to 100,000 g/mol,
the block copolymer has a polydispersity index PDI of less than 1.90, or
the block copolymer has a number average molecular weight Mn of from 1000 to 100,000 g/mol and a polydispersity index PDI of less than 1.90.

6. The composition according to claim 1, wherein the block copolymer comprises the monomer units derived from the fluorinated alpha-olefin of formula (II) in an amount of from 0.1 wt % to 70 wt %, and/or the block copolymer has a fluorine content of from 0.05 wt % to 35 wt %.

7. The composition according to claim 1, wherein the block copolymer is obtained by a nitroxide-mediated controlled polymerization (NMP).

8. The composition according to claim 1, wherein two neighboring blocks of the block copolymer are directly linked to each other.

9. The composition according to claim 1, wherein two neighboring blocks of the block copolymer are linked to each other via a linking group LG, wherein
the linking group LG is of formula (VII):

 (VII)

wherein the $IN_1'$ and $IN_2'$ groups, which can be the same or different from each other, are derived from initiator fragments $IN_1$ and $IN_2$ of the controlled free radical polymerization, and Y' is a divalent group covalently linked to the $IN_1'$ and $IN_2'$ groups or represents a covalent bond between the $IN_1'$ and $IN_2'$ groups.

10. The composition according to claim 1, wherein an amount of the block copolymer, relative to the total composition, is from 0.05 wt % to 15 wt %.

11. The composition according to claim 1, wherein the block copolymer is a gradient block copolymer.

12. The composition according to claim 1, wherein the block copolymer is obtained by nitroxide-mediated controlled polymerization with a polymerization regulator compound selected from the group consisting of formulas (IV), (V) and (VI) or selected from the group consisting of a polymerization regulator comprising the stable free nitroxyl radicals of formulas (IV), (V) and (VI) in conjunction with a radical source:

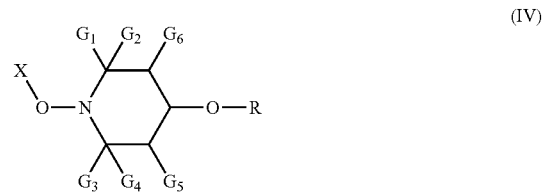 (IV)

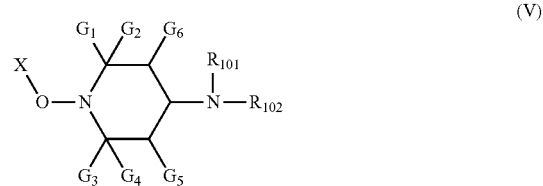 (V)

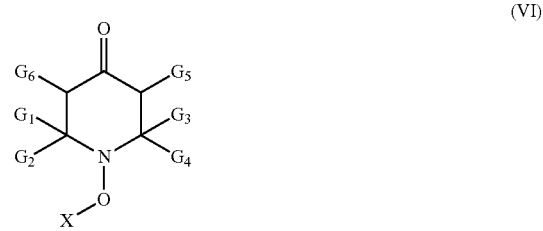 (VI)

wherein
R is hydrogen, $C_{1-18}$ alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms,
$R_{101}$ is $C_{1-12}$ alkyl, $C_{5-7}$cycloalkyl, $C_{7-8}$aralkyl, $C_{2-18}$alkanoyl, $C_{3-5}$alkenoyl or benzoyl,
$R_{102}$ is $C_{1-18}$alkyl, $C_{5-7}$cycloalkyl, $C_{2-8}$alkenyl, which can be unsubstituted or substituted by a cyano, carbonyl or carbamide group, or is glycidyl, a group of the formula —CH$_2$CH(OH)—Z or of the formula —CO—Z or —CONH—Z wherein Z is hydrogen, methyl or phenyl,
$G_6$ is hydrogen,
$G_5$ is hydrogen or $C_{1-4}$alkyl,
$G_1$ and $G_3$ are methyl,
$G_2$ and $G_4$ are ethyl or propyl, or $G_1$ and $G_2$ are methyl and G3 and G4 are ethyl or propyl; and
X is selected from —CH$_2$-phenyl, CH$_3$CH-phenyl, (CH$_3$)$_2$ C-phenyl, (C$_{5-6}$cycloalkyl)$_2$CCN, (CH$_3$)$_2$CCN,

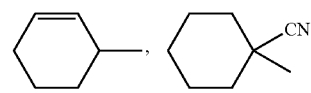

—$CH_2CH=CH_2$, $CH_3CH-CH=CH_2$, $(C_{1-4}alkyl)CR_{20}-C(O)$—phenyl, $(C_{1-4})alkyl-CR_{20}-C(O)-(C_{1-4})alkoxy$, $(C_{1-4})alkyl-CR_{20}-C(O)-(C_{1-4})alkyl$, $(C_{1-4})alkyl-CR_{20}-C(O)-N-di(C_{1-4})alkyl$, $(C_{1-4})alkyl-CR_{20}-C(O)-NH(C_{1-4})alkyl$, $(C_{1-4})alkyl-CR_{20}-C(O)-NH_2$, wherein $R_{20}$ is hydrogen or $(C_{1-4})alkl$.

13. The composition according to claim 1, wherein the composition is at least one of a coating composition, an ink composition, and an adhesive composition.

\* \* \* \* \*